United States Patent [19]

Steinmann et al.

[11] Patent Number: 4,548,669
[45] Date of Patent: Oct. 22, 1985

[54] LIGHT WAVEGUIDE WELDING DEVICE

[75] Inventors: Peter Steinmann, Deisenhofen; Reinhard Engel, Munich; Richard Parstorfer, Geltendorf; Rudolf Brugger, Puchheim; Gerhard Jonke, Gilching, all of Fed. Rep. of Germany

[73] Assignee: Siemens Aktiengesellschaft, Berlin & Munich, Fed. Rep. of Germany

[21] Appl. No.: 558,878

[22] Filed: Dec. 7, 1983

[30] Foreign Application Priority Data

Dec. 7, 1982 [DE] Fed. Rep. of Germany ....... 3245229

[51] Int. Cl.⁴ .................... C03B 23/20; B29C 27/06
[52] U.S. Cl. ........................ 156/358; 65/152; 156/366; 156/378; 156/378.6; 156/433; 156/502
[58] Field of Search ............... 156/502, 433, 378, 358, 156/366, 379 R, 378.6, 380.2, 380.3, 158, 159, 304.2, 64; 65/152, 158, 4.21; 29/464, 466, 468; 269/37, 909, 60, 58; 219/121 R, 121 EX

[56] References Cited

U.S. PATENT DOCUMENTS

| 4,047,283 | 9/1977 | Kunze | 29/466 |
| 4,102,717 | 7/1978 | Hensel | 156/158 |
| 4,152,190 | 5/1979 | Kurosawa et al. | 156/304.2 |
| 4,248,499 | 2/1981 | Liertz et al. | 65/4.21 |
| 4,313,744 | 2/1982 | Toda | 65/152 |
| 4,326,870 | 4/1982 | Bendit et al. | 65/4.21 |

FOREIGN PATENT DOCUMENTS 0025585 9/1980 European Pat. Off. .

Primary Examiner—Michael Ball
Attorney, Agent, or Firm—Hill, Van Santen, Steadman & Simpson

[57] ABSTRACT

A device for splicing light waveguides, such as optical fibers, having an internal sheath and an outer sheath, characterized by an arrangement for clamping each of the waveguides by engaging their sheaths and lowering the unsheathed end portion into a centering groove where the ends are heated and fused together by an alternating current discharge path. The required convergence and alignment of the light waveguide ends during the welding step are automatically controlled by an advanced arrangement which is sequentially controlled with the welding step. Subsequent to the gearing of the ends, the clamping element releases the waveguides adjacent to the fused joint and are moved by a restoring arrangement to stretch the joint into a straight line position.

23 Claims, 5 Drawing Figures

LIGHT WAVEGUIDE WELDING DEVICE

BACKGROUND OF THE INVENTION

The present invention is directed to a device for splicing the ends of a pair of light waveguides with the assistance of a clamping arrangement which mutually aligns the waveguide ends in a V-shaped centering groove relative to a melting device which fuses the ends of the waveguides together.

An example of a device for splicing the ends of the light waveguides together is disclosed in U.S. Pat. No. 4,326,870 and European published patent application No. 025585, both of which are based on the same Swiss application. The device of this patent has a clamping device for each of the light waveguide ends which are to be welded together with one of the clamping devices being axially displaceable. Thus, the light waveguides, which are clamped in these devices must already be precisely inserted in the welding position. The manual movement of the second light waveguide end relative to the already-secured light waveguide end then occurs with the second displaceable clamping device. The surface of the light waveguide ends are subsequently melted with the assistance of a gas burner and the ends will then unite to one another on the basis of surface tension. This device requires an extremely precise setting of all the elements with auxiliary devices that are manually operated. To assist in the operation of the setting of the elements, an optical device is provided to enable observation of the setting steps. The production of a weld location thus greatly depends on the manual dexterity of the respective operator of the device.

SUMMARY OF THE INVENTION

The present invention is directed to providing a device for splicing light waveguides in which as automatic as possible a sequence of welding process steps can be performed with the preliminary and followup work of the production of the splice in the device being combined for simplification according to the point of view of manipulability.

This object is achieved by a device for splicing a pair of ends of a pair of light waveguides. The device comprises a housing containing a clamping device, melting means for fusing the waveguide ends together, and means for applying a splice protector or splice protection connector to the splice joint of the pair of waveguides. The clamping device has a base supporting a support member with a V-shaped centering groove for receiving the waveguide ends which are free of all sheaths, and a pair of clamping means movable on the base along a first direction relative to the support member. Each of said clamping means includes a holding groove extending along said direction with a first fixing element for holding a waveguide with an external sheath in a portion of the holding groove spaced from the support member and a second fixing element for holding a waveguide free of the external sheath in a second portion of the holding groove adjacent to the support member. The second portion of the groove has a sloping bottom descending toward the centering groove and the second element includes a jaw having a sloping surface matching the sloping bottom of the second portion for urging the waveguide downward along the bottom of the holding groove so that the ends of the waveguide free of all sheaths extend into the centering groove. The clamping device has advance means for automatically moving one of the clamping means along said direction toward the other clamping means to urge the ends together during a melting thereof and restoring means for moving one of the clamping means away from the other to stretch the fused waveguide ends into a straight line configuration. The melting means includes a pair of electrodes arranged adjacent the support member to heat the ends, current supply means to supply alternating current to the electrodes to create an alternating current discharge path at the ends of the waveguides and electronic sequence control means for controlling the advance means and the melting means to operate in the desired sequence. Preferably, the housing is a portable carrying case and will also include cutting means for providing the ends of the light waveguides with the desired cut surfaces prior to the splicing operation.

An essential point of the invention is that the light waveguide splice, which is produced, is executed in a straight line form over its entire length so that a simple and space-saving as possible splice protection can be applied. When, as in the case given the subject matter of the invention, a stretch splice is striven for from the very outset, then this can be provided with a splice protection connector in the same device immediately after the actual completion of the splice or connection. The danger of damaging the light waveguide splice when transferring the splice is thus eliminated.

A further advantage of the device of the invention is that the sequence of connecting will automatically occur after the insertion of the light waveguide ends. The assembly work thereby is significantly reduced so that the uncertainties in the production of the splice as a result of the hitherto standard manual manipulations are avoided. After the light waveguide ends have been inserted, the lowering of the light waveguide ends automatically occurs by means of closing the fixing or clamping elements as a result of the jaw of the second element having a sloping or slanting surface engaging the end of the waveguide to urge it into the bottom of the sloping holding groove and into the centering groove. It is thereby advantageous that the light waveguide ends have to be stripped only at their outermost ends over a length that corresponds to about one-half the length of the centering groove. Clamping of the waveguides thus occurs on their sheaths. The first clamping occurs on the outer sheath by means of a simple clamping in the holding groove and the second clamping occurs closer to the centering groove and engages a sheath remaining after removal of the outer sheath. Preferably, this second clamping is assisted by pins which are resiliently urged against the waveguide. By clamping the sheaths, the surface of the waveguide ends are positioned and held without damage to the waveguide. In addition, when closing the second fixing or clamping element, the light waveguide end is automatically lowered by the engagement with the jaw so that the ends are simultaneously aligned in the centering groove relative to one another. Thus, the light waveguide ends converge in a rough fashion in an axial direction proceeding from both sides due to displacement of the clamping means.

The device preferably includes an optical magnification system which facilitates the adjustment by enabling observation thereof. After the rough adjustment, the splicing sequence is placed in operation such as by closing a key or switch. An automatic sequence control means begins operation to start melting the end surfaces of the light waveguide ends by means of generating heat with an alternating current discharge path. After a prescribed time, the advance means is actuated to move one of the two clamping devices and the light waveguide secured therein in an axial direction towards the rigidly clamped other light waveguide end to such an extent that a mutual fusing of the already-softened ends becomes possible. It should be noted that preferably this can only begin after the optical observation system has been pivoted into an observing position. The alternating current discharge path automatically switches off after the ends have been brought into engagement to allow the fused ends to cool to form a joint or splice.

After the splice location is cooled, the light waveguides which have been connected in the meantime by the joint are placed in a straight line configuration by the operation of the restoring means so that the straight line position is locked into the joint. This straight line position is now the starting position for the application of a splice protector or splice protector connector. A device, which is suitable for applying and fastening a splice protector to the still-clamped light waveguides, is also preferably provided in the device of the present invention. The application of the splice protector, while the waveguides are still clamped, enables reduction of possible damage to the newly formed joint.

Another advantage of the invention is that the magnification of the optical system can be switched so that the trimmed picture can be adapted to the respective operation. Markings on a ground glass screen facilitate observation. A suitable illumination device of the splice location with largely parallel light produces a clear distortion-free image. The employment of a suitable power supply, which also allows use of the device independent of external power lines, expands the area of application of the device, for example, to enable use of the device in the field. The device for splicing light waveguides is inventively augmented by providing a cutting means for the light waveguide ends as well as by providing a support arrangement for the finished light waveguide splices. All of these individual devices are matched in position relative to one another according to an ergonomic point of view so that the individual operations can be executed in proper sequence and in a surveyable manner. These devices are preferably combined in a carrying case or housing in such surveyable disposition and operational readiness so that the device is also suitable for rugged employment such as occurs while assembling optical lines in the field.

The manufacture of the splice thus occurs in the following sequence.

1. An optical clean fracture surface is produced at th light waveguide ends with the assistance of the cutter means as well as stripping the ends.

2. The pretreated light waveguide ends are inserted into the horizontal holding grooves.

3. The light waveguide ends with the assistance of the clamping elements are clamped so that the lowering of the stripped light waveguide end into the centering groove will occur automatically.

4. The welding distance is set with the assistance of manipulators of the clamping device.

5. An alternating current discharge path is created so that the advance means is automatically placed in operation after a preselected time to bring the already melted light waveguide ends together. After a cooling time, the second clamping element is opened and the waveguides are returned to a stress position.

6. The splice protector or protection connector is then applied to the joint which is in the straight line position.

DESCRIPTION OF THE PREFERRED EMBODIMENTS

Figure 4:
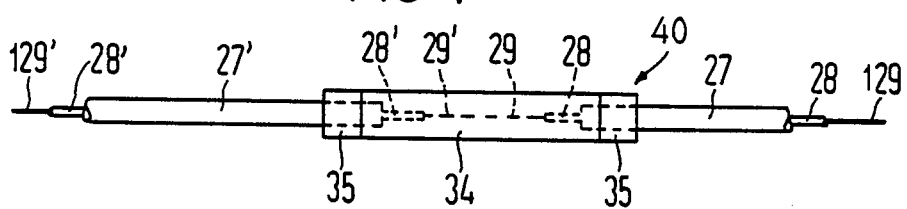
FIG. 4 is a side view of a light waveguide splice produced in accordance with the present invention.

The principles of the present invention are particularly useful when forming a splice connection generally indicated at 40 in FIG. 4. Each of the waveguides 129, 129' has a waveguide terminating in ends 29 and 29', respectively. Each of the waveguides 129, 129' which may be optical fibers have an inner sheath 28, 28' and an external sheath such as 27 and 27'. The waveguide connection 40 has the ends 29 and 29' joined together by a fused joint. To protect the joint, a splice protector or protection connector 34, which may be, for example, a sheet metal member bent in a U shape, has two ends which are pressed onto the outer sheaths 27 and 27'. As illustrated, the inner sheaths such as 28 and 28' remain in place except for the small exposed end portions 29 and 29'. The remaining free space in the U-shaped splice protection connector 34 can be filled with an air-hardenable silicone compound to provide further protection to the splice or fused joint.

Figure 1:
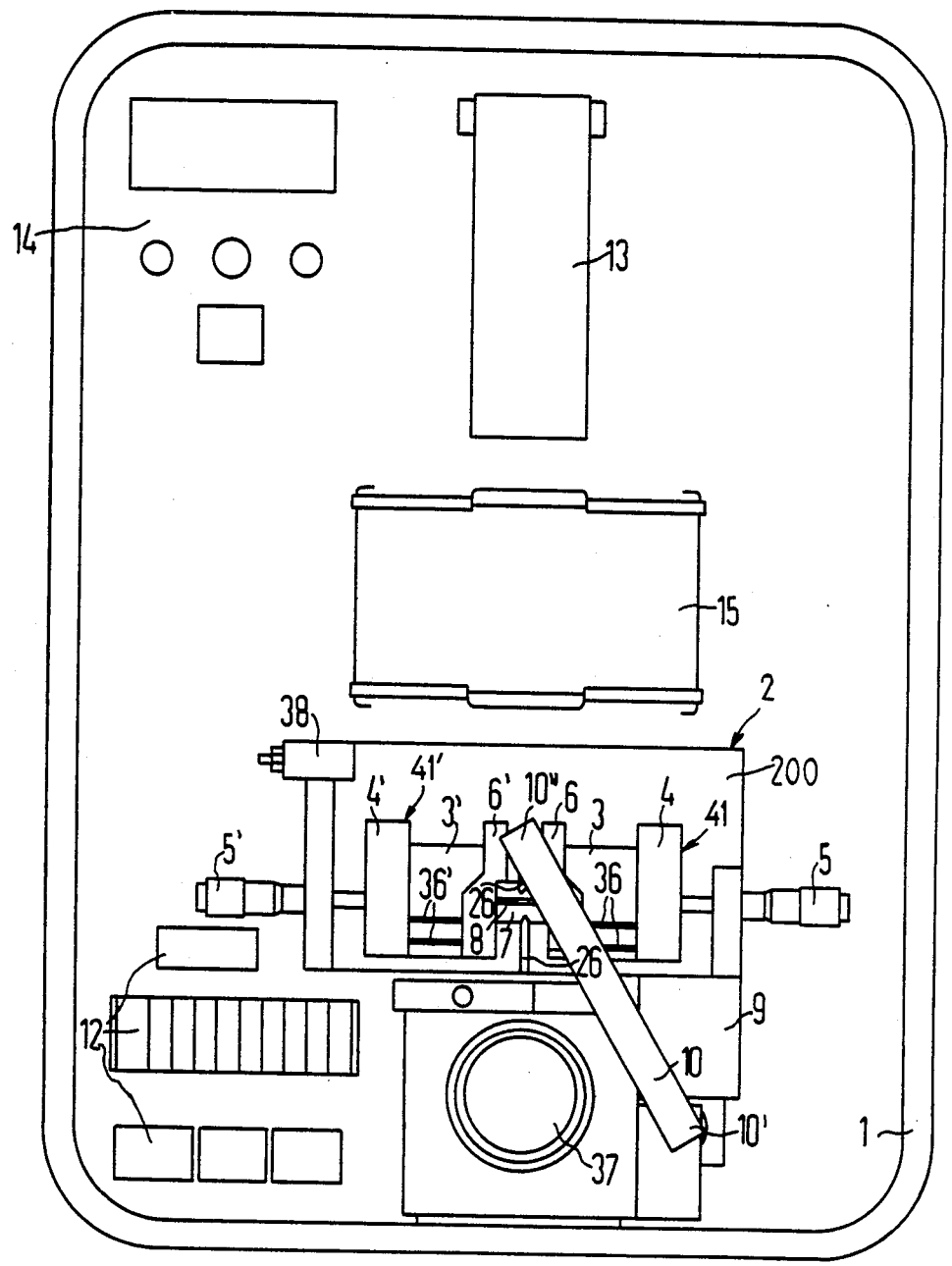
FIG. 1 is a plan view of a carrying case or housing containing the individual device according to the present invention.

To form the splice connection, an apparatus comprising a housing such as a carrying case 1 of FIG. 1 receives the various subcomponents of the apparatus. For example, the operating and observation elements 14 for the power supply are disposed, for example, in the upper left-hand corner of the case or housing 1 as illustrated in FIG. 1. The electrical power supply is carried out by means of an easily interchangeable and maintenance-free lead storage battery with which 150 splices per charge can be made. Continuous mode operation is also possible with the assistance of integrated charging devices for 110 and 220 volt operating voltages, respectively, or with the assistance of additional inputs from a 12 volt DC source. The charging operation or, respectively, the operating condition is indicated by means of a corresponding signal.

The casing or the housing 1 also has cutting means 13 for cutting the light waveguide ends. The cutting means 13 is a known cutting device that operates under the known cutting method of "tensile stress-flexural stress-notching". Such a cutting device provides good mirror fractures with angular errors of less than 3° and are achieved by means of notching with a hard metal blade that is designed as a reversible knife and can be renewed as needed by simply being turned around or end-for-end. After cutting the light waveguide ends with their lead sheaths, they are ready for the next step in the next unit of the device which is an actual welding apparatus 2 which is located in the case or housing 1.

The actual welding apparatus 2 has a base 200, which receives a pair of clamping means 41, 41'. The clamping means 41 is composed of clamping member 42 with a recess 3 and elements 4 and 6 while the means 41' has member 42' with a recess 3' and elements 4' and 6'. Each of the clamping means 41 and 41' are movable along a single direction by the assistance of micrometer screws 5 and 5', respectively. As illustrated, the base 200 also supports a holding member 7 which is preferably a ceramic member and has a centering groove 8 which has a V-shaped configuration. The member 7 is positioned between the two clamping means 41 and 41' with the V-shaped groove 8 extending along the direction which is the axial direction of the waveguides held by the clamping means such as 41 and 41'.

Figure 5:
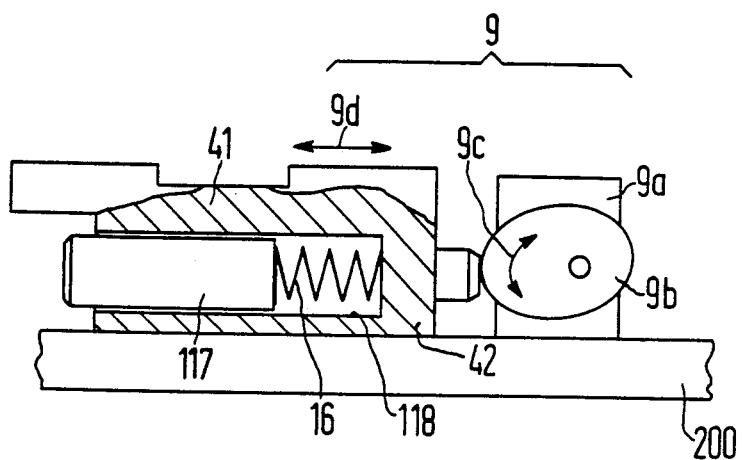
FIG. 5 is a side view with portions broken away for purposes of illustration of automatic advance means utilized in the present invention.

As a result of centering the light waveguides in the centering groove 8 and due to a good self-centering property of an arc created by a pair of electrodes 26, alignment of the light waveguide ends in a longitudinal direction is the only thing that is still required. This alignment is possible in a rough degree by means of adjustments with the micrometer screws 5 and 5' and the adjustment operation can be observed on a ground glass screen 11 (FIG. 3) with the assistance of a "projection" microscope lens 37 (FIG. 1) having, for example, a five-fold magnification. Given the splicing device according to the invention, the mutual approach of the light waveguide ends during the welding event is executed by means of an automatic advance means 9 after the light waveguide ends have already been softened or melted. The one of the clamping means such as 41 is moved by the advance means 9 (see FIG. 5) which includes an electromagnetic rotary magnet 9a which is provided with a cam plate 9b. the clamping means 41 is axially moved in the direction 9d toward the rigid clamping means 41' as a result of the rotation 9c of the cam plate 9b. To begin the welding operation, after adjustment of the microscrews 5 and 5', a throw switch in a control panel 12 (see FIG. 1) of the device is actuated and the welding operation is initiated after the adjustment of the two light waveguide ends has been completed. The rest of the operation, the preliminary welding, convergence of the light waveguide ends and the fusing then automatically occur in a desired sequence. The convergent path or the advance is adjustable and must be matched to the type of glass being utilized for the waveguides. In the welding, a high frequency alternating voltage of approximately 20 kHz produces an arc required for welding. As a result of the high surface tension of the molten glass, this arctype effects a very good self-centering of the light waveguides to be connected. The fiber offset of up to 20 um is thereby automatically compensated without any significant additional attenuation occurring in the joint. The welding sequence, however, can also be manually controlled. In this event, the current required for the preliminary welding in order to clean and round the end faces of the light waveguide ends and the current for the actual welding are respectively set separately and therefore optimally. Both operations are controlled by separate timers. The magnification of the optical viewing system can be adjusted so that the corresponding markings are faded in. The low magnification achieved at 10× thereby serves for setting the electrode spacing. The welding of the light waveguides can be easily accomplished with this device since the particular clean image can be achieved with the assistance of the special transmitting light illumination even though only a 10 watt halogen lamp is utilized. In order to save power, the on time of the lamp is controlled by an additional timer.

The welding operation, however, can only be initiated when a safety device provided for it is released. This safety device is connected to the optical viewing system since this is absolutely necessary during the welding. Injury hazards due to unintentional engagement of the welding current is thus practically impossible. This locking is insured by means of pivoting a glass rod 10, which is part of the optical viewing system around its one end 10' so that the other end 10" projects the viewing light onto the aligned waveguide ends. Thus, the welding location is covered by the glass rod 10 so that the weld location can no longer be touched.

After the welding, with the light waveguide ends remaining in a lower position in the V-shaped centering groove 8 and joined together, they are then placed into a straight line form by means of a restoring means 38 which corresponds to the advance means but which operates in a direction opposite to the advance means so that the two clamping means 41 and 41' are moved away from each other. The restoring means, like the advance means, include controllable gearing and also has catch elements which determine the interval between the clamping means 41, 41' that is necessary to bring the lowered fused light waveguide ends into a straight line configuration. The excess length between the clamping devices which arose due to the sag of the light waveguide into the groove 8 is eliminated in this manner. The welded light waveguide can now be provided with a metallic splice protection connector such as 34 in a known manner to which end the device for inserting the splice protection connector are likewise provided in the welding device 2 in the form of grooves such as 36 and 36' that extend parallel to the light waveguides. The splice protection connector 34 can be crimped onto the outer sheaths 27 and 27' of the light waveguides which are received in recesses 3 and 3' of the members 42 and 42' of the clamping means 41 and 41'. This crimping can be done by a respective pinching or crimping tool. For the purpose of recoating the splice location, the splice protection connector is subsequently entirely cast or filled with an air-hardening silicone rubber and necessarily is placed in a splice carrier plate 15 after the waveguides have been released from the clamping means 41 and 41'. The availability of the splice carrier plate 15 enables forming multiple splices of a cable containing multiple light waveguides with the present device. In addition, each of the clamping elements of the clamping means may have a comb extending at right angles to the direction to aid in handling multiple light waveguides.

Finally, all of the mechanical and electrical components of the device are designed in modular form. Given a malfunction, the faulty component can be easily replaced by a new one. A high degree of servicing ease is thereby additionally achieved. Finally, the position of the electrode pairs 26 is adjustable in a corresponding manner.

Figure 2:
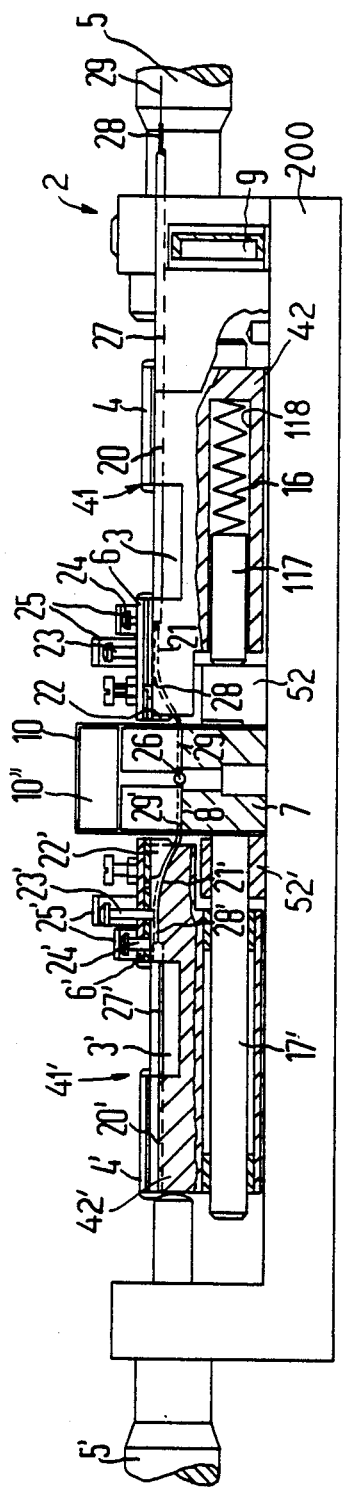
FIG. 2 is a partial cross-sectional view with portions in elevation for purposes of illustration of the actual welding device with the required clamping device.

The structure of the welding means 2 can be seen in FIG. 2. It should be noted that the structure is symmetrical except for the advance means 9 and the restoring means 38 (FIG. 1) As best illustrated, the clamping means 41 and 41' include the members or blocks 42 and 42' which have a groove or recess 3 and 3', respectively, that extends transverse to the one direction and the axis of the waveguides. Both of these members 42 and 42' are built to move on the base plate 200 with the movement being guided by guide members such as pin 17' which are anchored in a fixed member such as 52'. It should be noted that the member 42 is also guided by a similar member or pin anchored in the member 52. Movement toward the support member 7 can be accomplished by the use of the micrometer screws 5 and 5' and it is noted that movement toward the member 7 is opposed by a pin 117 and a spring 16 which are received in a bore 118 in each of the members such as 42 and 42' with only the spring and member shown for the member 42.

Each of the members 42 and 42' on an upper surface have a first holding groove 20 and 20', respectively, which are covered by a flap-like element 4 and 4', respectively. The element 4 and 4' acts as a fixed or clamping element and clamps the outer sheath 27 and 27' of the waveguide in the groove 20 or 20'. It should be noted that grooves 20 and 20' are at a level which is vertically displaced above the level of groove 8. Adjacent the holder member 7, the members 42 and 42' each have second grooves 21 and 21' which have a portion at the same level as the groove 20 and have a sloping bottom wall extending downward to the level of the centering groove 8. To hold the waveguide which as mentioned before may be an optical fiber having an inner sheath 28 and an outer sheath 27, a majority of the outer sheath 27 has been removed and a clamping or fixing element 6 having a plurality of pins 23 and 24 biased by springs 25 is provided. In addition, a jaw 22, which has a substantially triangular shape corresponding to the sloping bottom of the groove 21, is mounted to extend into the groove 21 and hold the waveguide with its inner sheath 28 on the sloping bottom of the groove 21. Thus, the end 29, which is free of all sheaths, is urged to extend into the centering groove 8. It should be noted that the member 42 has a groove 21', which is the same as the groove 21, and that the clamping element 6' has pins 23' and 24' which are urged by springs 25' and also has the jaw 22. Preferably, the jaws 22 and 22' are made of a synthetic material. The action of the jaws such as 22 and 22' bend the ends of the fibers obliquely downward so that the ends 29 and 29', which are completely stripped of sheaths in the end area, extend into the centering groove for alignment. Preferably, the centering groove 8 is formed in a ceramic part which forms the support member 7.

A rough positioning of the light waveguide ends occurs by use of displacing each of the clamping means 41 and 41' by the micrometer screws 5 and 5'. Observation of this procedure is possible on the basis of an optical apparatus or arrangement of which only the pivotal glass rod 10 is shown in FIG. 2. One of the electrodes 26 for the fusing means is visible and is located in the location of the splice of the ends 29 and 29'.

After roughly positioning the two clamping means 41 and 41', the advance means 9 is actuated in time sequence with a desired time delay after the initiation of the melting or welding step. The cam plate 9b, which is acted on by a rotary magnet 9a, acts against the clamping means 41 so that the rotary motion 9c is converted into an axially directed motion 9d. The cam plate 9b acts against the resistance of the spring such as 16 acting on the pin 117. It should be noted that the effect of this automatic precession during the welding operation which is produced by the gearing of the advance means or controlled by the sequential control means, occurs as play-free as possible. After the conclusion of the actual welding event, the spring arrangement of the restoring means serves to return clamping means 41 to an initial position so that after release of the clamping elements 6 and 6', the fused ends are placed in a stretched, straight line position. The respective advance and return paths can be matched by means of corresponding adjustment screws. After the fused light waveguides have been brought into the stretch position and the glass rod 10 has been pivoted away, the splice protection connector can be placed over the splice so that it is pressed onto the outer sheaths 27 and 27' in the areas of the recesses 3 and 3' with the assistance of nippers and/or crimping tools. The light waveguide splice can now be finished in this manner without having to be transferred. This will considerably reduce the damage hazard to the splice location and also facilitates the assembly.

Figure 3:
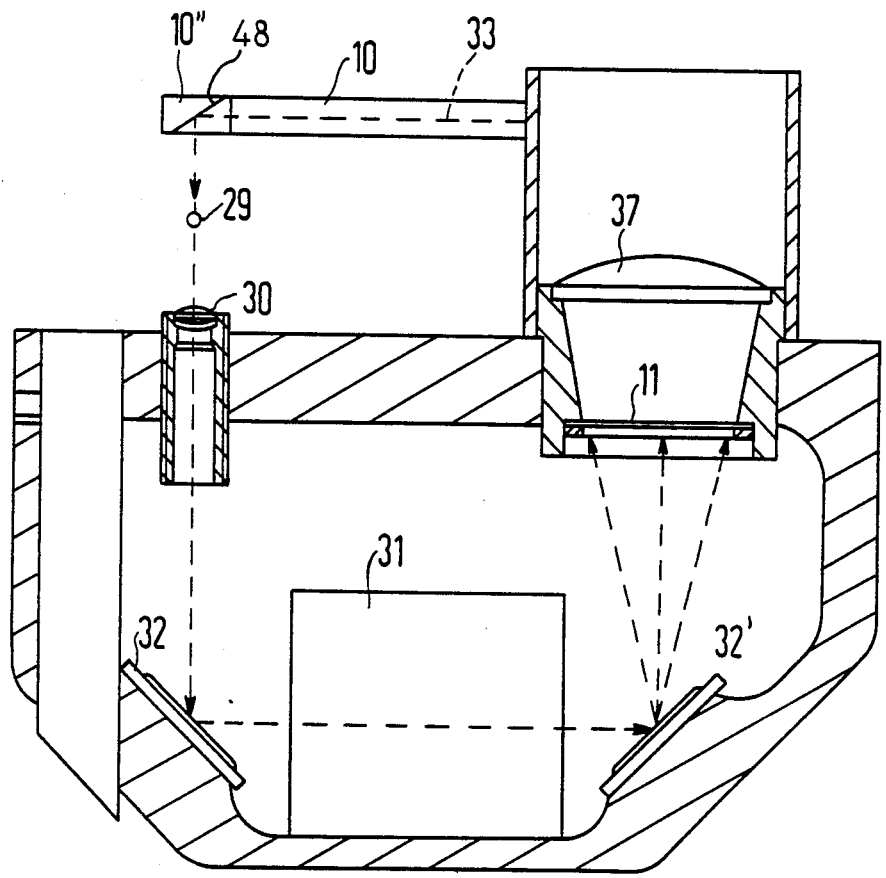
FIG. 3 is an enlarged cross-sectional view of the optical system.

As previously mentioned, the device includes an optical deflection system which is best illustrated in FIG. 3. Parallel light beams 33, which are generated for the system by the assistance of a halogen lamp, are introduced into the glass rod 10 of the deflection system through a condenser lens. The approximately parallel light beams 33 proceed through the glass rod 10 where they are reflected through an angle of 90° by a deflector 48 at the end 10" onto the waveguide ends 29 and 29'. The system includes an optical lens system 30, which receives a light after it passes the ends 29 and 29' and directs it at a deflection mirror 32 which reflects it through a switchable magnification means 31 to a second deflection mirror 32' that reflects as the ground glass image screen 11. The ground glass image screen is viewed with a magnifying glass such as 37. The required markings are also imaged on the ground glass screen in accordance with a scale so that the respective relationship of the light waveguide and the electrodes can be viewed clearly and in a proper relationship. The welding operation can thus be monitored in a surveyable manner from the beginning to the end. The adjustment operation of the light waveguides can thereby be viewed best with a five-powered magnification and the adjustment of the electrode spacing with a ten-powered magnification. Such a change in the magnification occurs in the switchable magnification means 31.

Although various minor modifications may be suggested by those versed in the art, it should be understood that we wish to embody within the scope of the patent granted hereon, all such modifications as reasonably and properly come within the scope of our contribution to the art.

We claim:

1. A device for splicing a pair of ends of a pair of light waveguides comprising a housing containing a clamping device, melting means for fusing the ends of the waveguides to form a splice joint therebetween and means for applying a splice protector to the splice joint of the pair of waveguides, said clamping device having a base supporting a support member with a V-shaped centering groove for receiving the waveguide ends free of sheaths, a pair of clamping means movable on the base along a first direction relative to said support member, each of said clamping means including a holding groove extending along said direction with first clamping element for holding a waveguide with an external sheath in a portion of the holding groove spaced from the support member and a second clamping element for holding a waveguide free of the external sheath in a second portion adjacent the support member, said second portion of the groove having a sloping bottom descending downward toward the centering groove, said second element including a jaw having a sloping surface matching the sloping bottom for urging the waveguide downward along the bottom of the holding groove so that the end of the waveguide free of all sheaths extends into the centering groove, said clamping device having advance means for automatically moving one of the clamping means along said direction toward the other clamping means to urge the ends together during fusion thereof and restoring means for moving one of the clamping means away from the other to stretch the fused waveguide ends into a straight line configuration; said melting means including a pair of electrodes arranged adjacent the support member to heat the ends, current supply means to supply alternating current to the electrodes to create an alternating current discharge path at the ends of the waveguides and electronic sequence control means for controlling the advance means and the melting means to operate in the desired sequence.

2. A device according to claim 1, wherein the second clamping element includes pins biased against the waveguide to hold the waveguide in the second portion of the holding groove.

3. A device according to claim 1, which includes an optical deflection system for directing parallel light at the weld location to enable observing the weld connection, said deflection system including convertible magnification means to change the magnification of the image of the joint.

4. A device according to claim 3, wherein the device includes a glass rod for conveying light from a source to project onto the ends being joined together, said glass rod being pivotable between a first position overlying the ends being joined together and a second position removed therefrom and a switch being turned on when the rod assumes the first position to enable energizing the current supply means to create the alternating current discharge path.

5. A device according to claim 4, wherein the optical deflection system includes a condenser lens for generating the parallel light beams.

6. A device according to claim 4, wherein the optical deflection system includes a ground glass screen having markings to enable viewing the splicing location.

7. A device according to claim 4, wherein the connectible magnification means enable changing the magnification from five-power magnification to ten-power magnification.

8. A device according to claim 3, wherein the optical deflection system includes a safety to prevent actuation of the current supply means.

9. A device according to claim 1, which includes an independent power source disposed in the housing so that the device can operate free of external power requirements.

10. A device according to claim 1, wherein the support member is a ceramic part.

11. A device according to claim 1, wherein each of the clamping means are axially movable by means of micrometer screws on the base.

12. A device according to claim 1, wherein the advance means includes controllable gearing driven by the sequence control means.

13. A device according to claim 12, wherein the restoring means includes catch elements which determine the interval that is necessary to bring the lowered fused light waveguide ends into a straight line, stretched position.

14. A device according to claim 12, wherein the controllable gearing comprises a rotary magnet with a cam plate.

15. A device according to claim 1, wherein the jaw on each of the second clamping elements consists of a synthetic material.

16. A device according to claim 1, wherein clamping elements of each of the clamping means include a comb extending at right angles relative to said direction to aid in handling a plurality of light waveguide ends of a cable.

17. A device according to claim 1, wherein the means for applying a splice protector include slots extending parallel to the inserted waveguides and recesses in members of the clamping means.

18. A device according to claim 1, wherein a holder for receiving finished splices is disposed adjacent the clamping means.

19. A device according to claim 1, wherein a cutting means for cutting the ends of the waveguides is arranged in the housing adjacent the clamping device.

20. A device according to claim 19, wherein the cutting means utilizes a reversible blade.

21. A device according to claim 1, wherein the frequency of the alternate current discharge path created by the current supply means amounts to 20 kHz.

22. A device according to claim 1, which includes cutting means for cutting the ends of the waveguides and a holder for receiving completed splices with the splice protectors, said holder means and cutting means being arranged relative to the clamping device in view of an ergonomic point of view and are matched to one another.

23. A device according to claim 22, wherein the housing is a portable carrying case.

* * * * *